United States Patent [19]
Rehquate et al.

[11] Patent Number: 5,649,111
[45] Date of Patent: Jul. 15, 1997

[54] DATA PORT EXPANDER

[75] Inventors: Rudolf Eugene Rehquate, Raleigh; Thomas Edward Stammely, Cary, both of N.C.; Jeffrey Matthew Stoltz, Bristol, Pa.

[73] Assignee: International Business Machines Corporation, Armonk, N.Y.

[21] Appl. No.: 573,902

[22] Filed: Dec. 18, 1995

Related U.S. Application Data

[63] Continuation of Ser. No. 98,678, Jul. 28, 1993, abandoned.
[51] Int. Cl.$^6$ .................................. G06F 3/00; H04J 3/02
[52] U.S. Cl. .................. 395/200.2; 395/200.2; 395/200.21; 370/200
[58] Field of Search .................. 395/200.02, 200.2, 395/200.21; 340/825.5; 370/85.5, 85.15

[56] References Cited

U.S. PATENT DOCUMENTS

| | | | |
|---|---|---|---|
| 4,701,630 | 10/1987 | Annunziata et al. | 307/112 |
| 5,179,291 | 1/1993 | Nishikawa et al. | 307/139 |
| 5,199,026 | 3/1993 | Lund | 370/56 |
| 5,303,387 | 4/1994 | Millard et al. | 395/200 |
| 5,311,515 | 5/1994 | Henderson et al. | 370/85.1 |
| 5,353,286 | 10/1994 | Patrick et al. | 370/85.15 |

*Primary Examiner*—Parshotam S. Lall
*Assistant Examiner*—Viet Vu
*Attorney, Agent, or Firm*—Joscelyn G. Cockburn

[57] ABSTRACT

A device which attaches multiple workstations, printers, computers or the like to a single lobe of a communications network includes a multistation access unit (MAU) with multiple ports and a voltage generator unit which generates a phantom current to activate a remote switch which allows one or more ports on the MAU to transmit or receive information from the communications network.

10 Claims, 6 Drawing Sheets

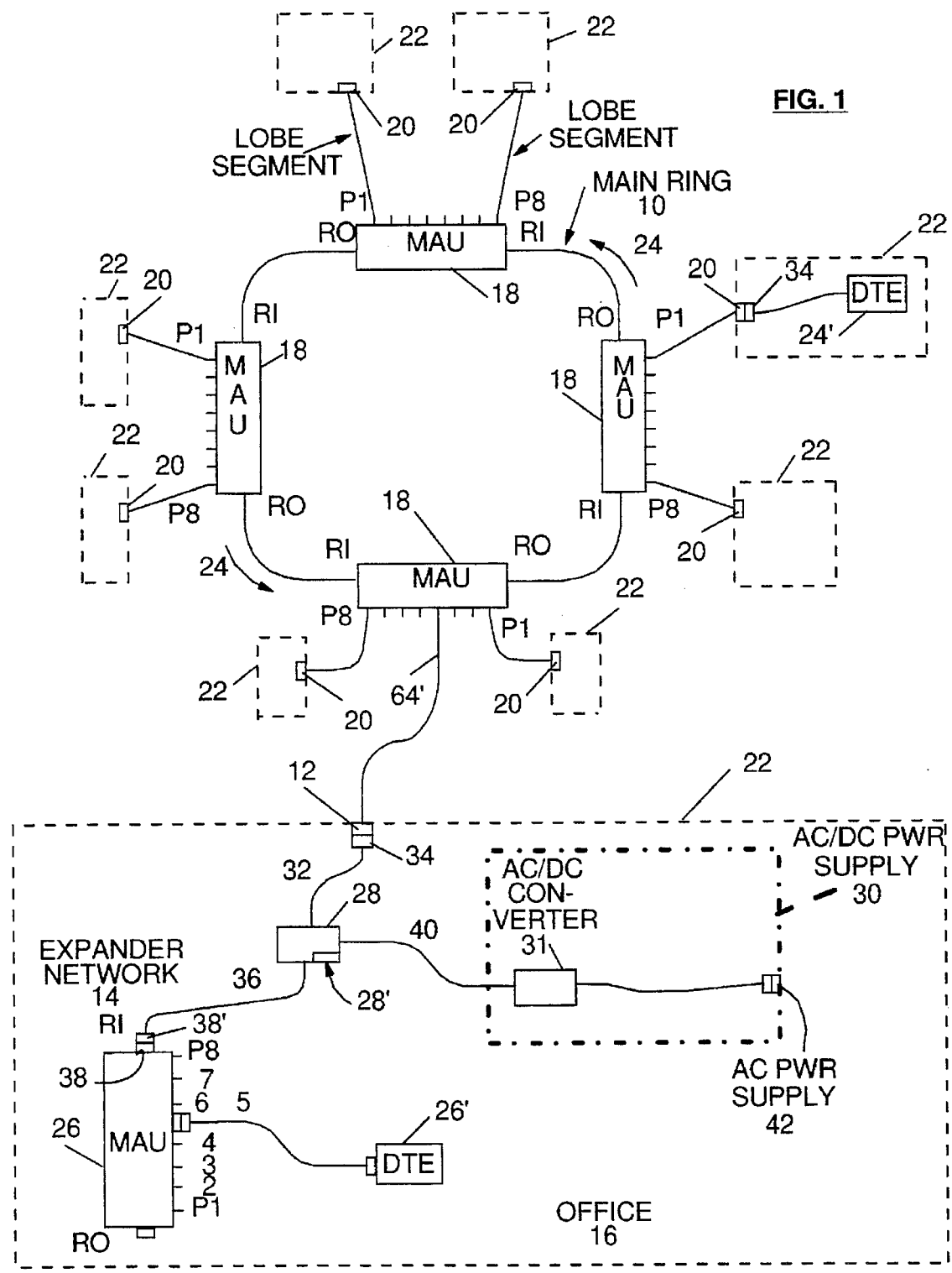

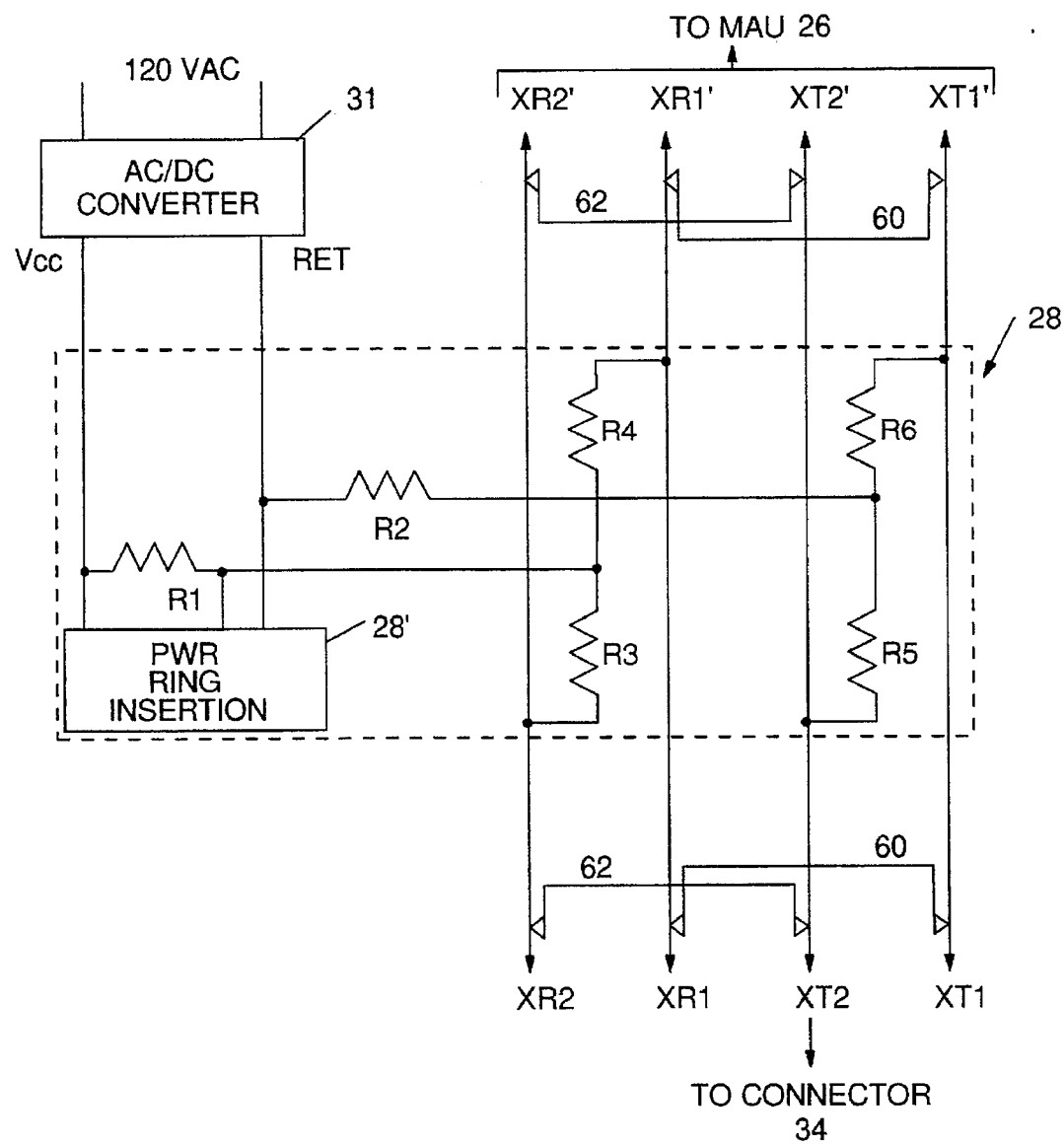

DATA PORT EXPANDER

This is a continuation of application Ser. No. 08/098,678 filed Jul. 28, 1993, now abandoned.

BACKGROUND OF THE INVENTION

1. Field of the Invention

The present invention relates to communications networks in general and in particular to devices used in such networks to interconnect multiple outlets or ports to a single network lobe.

2. Prior Art

The proliferation of computers, work stations, servers, etc. (collectively called Data Terminal Equipment, DTE) creates a requirement for additional ports which interconnect such DTEs to a communications network. The communications network provides the data highway interconnecting the DTEs so that one DTEs may communicate with others.

Among the different types of communications networks is the Local Area Network (LAN) which is used to interconnect DTEs in a building or limited geographical area such as a college campus, etc. The LANs are also divided into different types. Among the different types of LANs is the well-known ring LAN. The ring LAN is a serial network in which DTEs are sequentially connected to a closed loop transmission media. The information to be transmitted on the network is packaged into packets by a source DTE and is sequentially transmitted by DTEs located between the source DTE and a receiving DTE.

The interconnection of a DTE to the closed loop transmission media is effectuated by data connectors positioned in the selected walls of an office, etc. The wiring system forming the LAN is located behind the walls and ceilings of the office. The typical LAN installation provides a single outlet for each office. Often times the need arises for a plurality of outlets in an office or other area where the original wiring provides one or a limited number of connections into the closed loop transmission media.

The obvious way of providing additional outlets is to interconnect the additional outlets to an available outlet located in the office or other areas. The prior art, such as U.S. Pat. Nos. 5,101,405; 4,905,230; 4,862,158; 4,757,497 and 4,701,630 disclose devices and techniques for attaching multiple DTEs to a single outlet in an office (U.S. Pat. No. 4,701,630) or multiple DTEs to a single lobe of the LAN (U.S. Pat. No. 4,862,158).

Even though the prior art provides additional outlets in an office or other work areas, the mechanisms which provide the expansion are complicated and often times require work on the wiring system located behind the office walls and/or ceilings. Needless to say, accessing the original wiring systems are expensive and sometimes access to such systems is impossible.

Most LANs are designed to conform with standards such as the IEEE 802.5 Standard for Token Ring LAN. The standards set forth protocols (including timing signals) and formats which are required to transmit or receive information from the network. Usually, if multiple DTEs are connected to a single lobe or outlet, the timing and other protocols from the lobe or outlet is altered and the network is no longer in compliance with the standard. To overcome this problem, corrective circuitries and techniques are required on the port or in the lobe expansion mechanism in order to comply with the selected standard.

SUMMARY OF THE INVENTION

It is a general object of the present invention to provide a more efficient port expander than has heretofore been possible.

It is another object of the present invention to provide a port expander which is simple to implement and has very little impact on the IEEE 802.5 Standard for Token Ring. The port expander according to the teachings of the present invention is a combination of a multi-station access unit and a phantom current generator means.

In particular, the port expander includes a multiport concentrator having an input/output (I/O) port for providing a phantom current (DC level signal) used to activate a network remote insertion switch. A phantom current generator generates a DC signal at a predetermined level and distributes the DC signal to the I/O port of the multiport concentrator. The electrical interrelationship between the phantom current generator and the switching modules associated with each port of the multiport concentrator is such that the DC signal does not exit the multiport concentrator to the remote insertion switch until at least one of the DTEs connected to ports of the multiport concentrator is activated (i.e., turns on).

The foregoing features and advantages of the present invention will be more fully described in a description of the accompanying drawings.

BRIEF DESCRIPTION OF THE DRAWINGS

FIG. 1 shows a block diagram of a ring communications network including the teachings of the present invention.

FIGS. 3A and 3B show a circuit arrangement and a pictorial representation of the circuit controlling the phantom current.

DETAILED DESCRIPTION OF THE PREFERRED EMBODIMENT

Figure 2A:
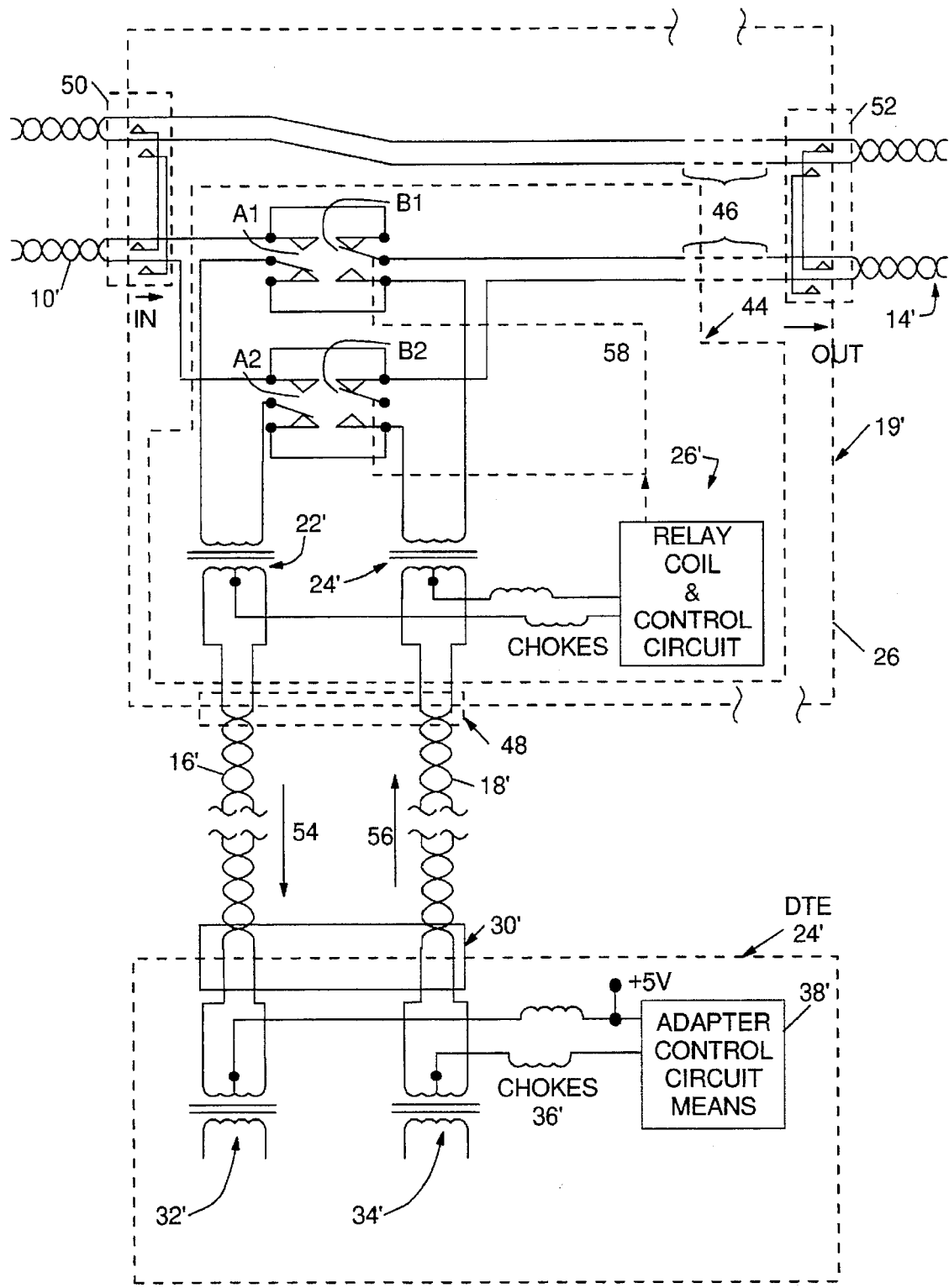
FIGS. 2A and 2B show a circuit diagram and a pictorial representation of the Multistation Access Unit (MAU) used in FIG. 1.

FIG. 1 shows a ring communications network according to the teachings of the present invention. The ring communications network includes a main ring or backbone ring 10 interconnected by wall connector 12 to an expander network 14. Preferably, the main ring network 10 is pre-wired in the wall of a building. The expander network 14 is provided in an office 16 or other area such as a classroom in which there are a limited number of access ports or connectors 12 into the main ring network.

The main ring network 10 includes a plurality of multistation access units (MAU) 18 interconnected by their respective ring in (RI) port and ring out (RO) port to their respective upstream and downstream neighbors. Any of the well-known transmission media such as copper wire, fiber optics, etc., can be used as the transmission media for interconnecting the MAUs. Each of the MAUs 18 has a plurality of ports (P1–P8) connected by lobe segments to connectors 20 located, for example, in office walls 22. Each lobe is connected to a port of MAU 18 and terminates in a connector at the walls or other area of the building. Each of the MAUs in FIG. 1 shows two lobes connected to respective wall connectors and a plurality of intermediate lobes partially shown. However, it should be noted that these partially shown lobes are connected to respective connectors similar to those of connector 20 in other office walls or other areas. Thus, each of the MAUs 18 includes eight ports to which data terminal equipment (DTE), such as DTE 24, can be connected in the office to connector 20. The RO and RI ports are also on each MAU 18, but are used for interconnecting the MAU to the main ring. Of course, other types of configurations could be used in the wiring scheme without deviating from the teaching or spirit of the present invention.

The MAUs 18 could be the MAU marketed by the assignee of the present invention and is identified by model number 8228. Alternately, the MAU can be any one of the conventional MAUs which are being marketed by other vendors. Likewise, the connector 20 is of the self-shorting type which is described in U.S. Pat. No. Reissve 32,760 and U.S. Pat. No. 5,030,114. The self-shorting type connectors are well known in the art, therefore, detailed description will not be given here. Suffice it to say that the self-shorting connectors are hermaphroditic which means that when one connector mates with another connector (such as is shown relative to DTE 24' (FIG. 1), or the expander network 14 relative to connector 12) data signals pass through connector 12 or 20 to the attached devices. However, in the event that the connector is not mated with a similar connector, a pair of shorting bars in the connector shorts the transmit pair of conductors (to be described subsequently) with the receive pair of conductors (to be described subsequently) and, as a consequence, the signals are looped within the connectors. The overall result is that the network is always configured as a loop whether the wall connector is attached to the expander network 14 (FIG. 1) or data terminal equipment 24 in the office. If nothing (that is, a DTE or expander network 14) is connected to a wall data connector, the network signal loops in the connector and, as a result, the network is still configured as a loop. Data transmission on the network is unidirectional such as that shown by arrow 24 and the protocol and format on the network is in accordance with the IEEE 802.5 standard, popularly known as the Token Ring standard.

Still referring to FIG. 1, the expander network 14 is positioned on the inside wall of the building and accesses the network through data connector 12. The main function of the expander network 14 is to provide additional ports so that other DTEs, such as DTE 26' and others (not shown), can be attached into the main ring. The expander network 14 includes a MAU 26, a data port expander controller 28 and an AC/DC power supply 30. The MAU 26 provides additional ports to which DTEs, such as DTE 26', can be connected. The remote port multiplier 28 provides the phantom current (to be described subsequently) which is transmitted through connector 12 to activate a port (not shown) in MAU 18. Likewise, the AC/DC power supply 30 provides the DC power from which the phantom current is generated. The phantom current activates the port switch in MAU 19, details of switch shown in FIG. 2A, to which the expander network 14 is connected. The MAU 26 is a multi access or multiport unit similar to MAU 18 or 19 which is used in the main ring 10. To this end, MAU 26 has a ring in (RI) port, a ring out (RO) port and eight data ports numbered 1 through 8 to which DTEs could be attached. For brevity, only DTE 26' is connected by an expansion lobe to port 5. As will be explained subsequently, all of the ports in the MAU (i.e., RI, RO and data ports) are each provided with a hermaphroditic connector. The mating connector is attached to the DTE and, when mated with the connector on the MAU, communications through the connector is effectuated. As stated before, if the connector is unplugged or not attached to a device, the connector is shorted and the network loop remains closed.

Still referring to FIG. 1, the data port expander 28 provides the phantom or DC current which is used to activate one of the ports in MAU 14 when a device such as DTE 26' wants access into the network. Before describing the components in expander network 14, a brief description of the operation of the network of FIG. 1 will be given. As stated previously, the network operates according to the Token Ring standard set forth in the IEEE 802.5 Standard for LAN. This standard requires that when a DTE, such as DTE 26', wishes entry into the network, the DTE generates a phantom current (i.e., DC current) of a predetermined level which is transmitted through connectors, etc., which attach the DTE to a network switching mechanism Mau 18 interconnecting the DTE into the network. As a result, the switching mechanism (to be described subsequently) is activated and inserts the DTE into the network. When the DTE wishes to de-insert from the network, it drops the phantom current and the switching mechanism which attaches a port to the network is placed in the open position and, as a result, the data terminal equipment is no longer in the network (i.e., de-inserted). Thus, the DTE determines when it goes into the network and when it de-inserts from the network. When the DTE is not in the network, the switching mechanism (to be described subsequently) is shorted and closes the loop and, as such, other devices on the network can communicate without the signal entering the DTE which does not want to communicate with devices on the network.

Still referring to FIG. 1, the data port expander (DPE) 28 includes the circuitry which controls the DC current which provides the means for entering a station connected to MAU 26 into the network. It should be noted that DPE 28 can be fabricated within MAU 26 as a separate unit as is shown in FIG. 1. In essence, the decision to fabricate DPE 28 into MAU 26 is a matter of design choice and does not affect the scope or spirit of the present invention. The design shown in FIG. 1 shows DPE 28 as a separate unit connected through conductor 32 to hermaphroditic connector 34. The hermaphroditic connector 34 mates with previously described hermaphroditic connector 12. Similarly, DPE 28 is connected over conductor 36 to hermaphroditic connector 38. As will be explained subsequently, cables 32 and 36 each include a pair of twisted pair conductor labeled transmit pair and receive pair, respectively. Likewise, conductor 40 interconnects DPE 28 to AC/DC power converter 31. The AC/DC power converter 31 plugs into an AC power supply outlet 42 via a conductor. In this configuration, the AC signal from the AC outlet 42 is converted into a DC voltage level and current by the power converter 31 which is a conventional AC/DC power converter. Such power converters are off-the-shelf items which are well-known in the art and further description is not warranted. The DC signal is fed over conductor 40 to DPE 28 which distributes the DC current appropriately on the transmit and receive conductor pairs to be described subsequently of cable 32.

FIG. 2A shows a partial schematic of the MAU unit 26. As stated previously, the MAUs shown in FIG. 1 are electrically identical. Therefore, only one will be described, it being understood that the others are functionally identical to the described unit. The purpose of the MAU is to provide the mechanism through which a DTE, connected to one of its several ports, is given entry into the network. The MAU includes a housing 26' in which a plurality of attachment modules are mounted. For brevity, only one of the modules identified by numeral 44 is shown. The broken lines identified by numeral 46 indicates that additional attachment modules are provided in each MAU.

Still referring to FIG. 2A, each port of the MAUs is coupled to a hermaphroditic connector; only three of which are shown. It should be noted that each of the attachment modules in housing 26' is coupled to a respective hermaphroditic connector (such as 48) through which an external DTE can be coupled to the network. In addition, the Input and Output ports (labeled by numerals 50 and 52) are used for interconnecting MAUs to form a network, With this construction, if the MAU provides attachment for N DTEs, there would be N hermaphroditic connectors provided in the housing to accept mating connectors from the DTEs. The housing 26' is fitted with a Ring In (RI) connector 50 and a Ring Out (RO) connector 52. The ring in connector 50 accepts the input section of transmission media 10', while the ring out connector is connected to the ring out section 14' of the transmission media. Preferably, in this specific embodiment, the transmission media 10' and 14' are twisted pair wires. As stated above, other types of media could be used without deviating from the spirit or scope of the present invention.

Figure 2B:
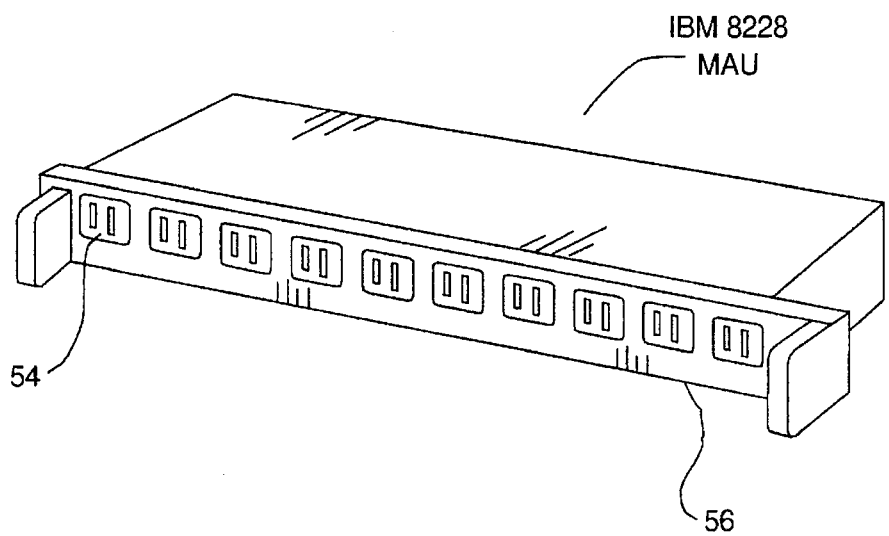

Turning to FIG. 2B for the moment, an isometric view of the MAU is shown. This version of the MAU has a plurality of access ports along the length of the unit. In this design, the access ports at the extreme ends identified by numerals 54 and 56 represent the Ring In and Ring Out ports which are used to attach the media which connects the MAU to other MAUs forming the ring. The ports in between are then used for attaching individual DTEs to the ring. With specific reference to the MAU shown in FIG. 2B, two of the ports are used as ring in and ring out ports and eight other ports are available for attaching users's devices, also called DTEs. Of course, the number of access ports could be more or less than eight.

Turning to FIG. 1 for the moment, when the MAU is used as a port expander (according to the teachings of the present invention) the Ring In (RI) is connected to DPE controller 28. As previously stated, the DPE controller 28 provides the phantom current which controls a switch in MAU 18 so that a DTE station connected to one of the ports of MAU 26 is given access to the ring. The RO port is left unused and, as stated previously, in the unused state a loop is automatically formed in the hermaphroditic connector and signals on the output wires are looped back to the input wires. However, additional ports can become available in the expander network 14 by cascading additional MAUs to the RO port of MAU 26.

Referring again to FIG. 2A, the Data Terminal Equipment (DTE) 24' is connected to the MAU by a cable which includes two pairs of twisted wires identified by numerals 16' and 18'. One of the twisted pair wires, 16', is the receive pair and transmits data from the network in the direction shown by arrow 54 into DTE 24'. Similarly, the other pair of twisted wires 18' is the transmit pair and transmit data in the direction shown by arrow 56 into the communications network. The ends of the cable mating with the MAU terminates in a hermaphroditic connector which coacts with the hermaphroditic connector, such as 48, mounted in housing 19'. The other end of the cable is connected in similar fashion through connector 30' to the DTE 24'. As stated previously, when the hermaphroditic connector (not shown) of the cable is in mating relationship with the hermaphroditic connector 48 that is mounted to the housing 19', the signals from the network or to the network passes freely through the connector. If the connectors are not in mating relationship, the shorting bars in the connector cause the signal to wrap at connector 48.

Still referring to FIG. 2A, the hermaphroditic connector 48 is coupled by transformer means 22' and 24' to switching means 58. The switching means 58 provide actual access to the ring of the network. The switching means may be electronic switches or, as shown in the drawings, a relay identified by numerals A1, A2, B1 and B2. The relay switch is controlled by relay coil and control circuit means 26'. The relay coil and control circuit 26' is connected through respective coils labeled chokes to the center tap points on the primary side of transformer 22' and 24'. Similarly, connector 30' in each of the DTEs is coupled through transformers 32' and 34' to the output section of the DTE (not shown). The transformer center taps are provided on the secondary side of each of the transformers 32' and 34' respectively and are connected, in turn, through choke 36' to the adapter control circuit means 38' and a positive voltage supply source.

As stated previously, communications on the network are in accordance with the IEEE 802.5 standard for data transmission. Since this is a well-known standard, only the portion necessary to understand the present invention will be described. The standard in part requires that when a data terminal equipment, such as DTE 24' (FIG. 2A), wishes to access the network, the adapter control circuit means 38' generates a DC current referred to as the phantom current which is fed over the interconnecting wires into relay coil and control circuit 26'. The control circuit in the relay and control circuit 26' builds up a voltage of sufficient magnitude to open and close the contacts of the switching means 58. When the electrical energy stored up in the control circuit is of a sufficient magnitude, the contacts are opened (i.e., placed in a first state) and signals on the network are transmitted over receive pair 54 into the DTE 24'. Similarly, signals from the DTE are transmitted over twisted pair 56 into the network. When the DTE drops the DC signal, the relay is placed in the other state (i.e., closed) and the terminal is de-inserted from the network. It should be noted that the DC signal is never transmitted onto the ring. The DC signal is contained within the DTE 24 and the MAU. However, the AC or data signal is transmitted over transformers 32', 34', 22' and 24' into the network. In summary, only AC data signals are allowed to be transmitted on the communications network.

Referring again to FIG. 1 for the moment, the expander network 14 of the present invention includes MAU 26, DPE controller 28 and AC/DC power supply 30. The DPE 28 is fitted with a display panel 28' which has light emitting diodes (LEDs) indicating the operational state of the expander network. Even though the DPE and its associated power supply is shown as a separate unit, this should not be construed as a limitation on the scope of this invention since it is well within the skill of the art to fabricate circuits with these components inside the cover of MAU 26.

FIG. 3A shows the circuit arrangement for DPE controller 28 coupled to display panel 28' and AC/DC converter 31. The AC/DC converter 31 is an off-the-shelf device (i.e., a standard converter unit) which plugs into a wall socket providing 120 volt AC and generates a DC voltage on its output port, Vcc. Wall units for converting AC to DC are well known in the prior art. Therefore, further discussion of this unit will not be given. The function of the remote port multiplier controller 28 is to receive the Vcc DC signal and generate therefrom a DC current signal at a predetermined current density, across the two transmit pairs XT1, XT2 and XR1, XR2. The level of the DC current generated is identical to the phantom current required for activating the switching relay to which the expander network 14 is connected in the MAU 18 (FIG. 1).

Still referring to FIG. 3A, the wire pair labeled XT1 and XT2 represents the transmit pair. The ends of the transmit pair adjacent to the arrow labeled to connector 34 is connected to terminal points in the hermaphroditic connector 34 which mates with hermaphroditic connector 12 (FIG. 1). Similarly, the ends of the receive pair labeled XR1 and XR2 terminates in another set of terminal points in the hermaphroditic connector 34 (FIG. 1). When the hermaphroditic connector 34, connected to the ends of transmit pairs XT1, XT2 and receive pairs XR1, XR2, is not plugged into the connector 12, the shorting bar (not shown) in connector 34 causes a short across wires XT1 and XR1 and XT2 and XR1. The short is indicated by the lines identified by numerals 60 and 62, respectively (FIG. 3A).

Still referring to FIG. 3A, the ends of the twisted pair wires labeled XT1', XT2', XR1' and XR2' are connected to a hermaphroditic connector 38' that mates with hermaphroditic connector 38 (FIG. 1). This is indicated by the arrow identified as to MAU 26. As stated above, the function of DPE controller 28 is to divide the power from the AC/DC voltage converter 31 so that it is equally distributed across transmit pair XT1, XT2 and receive pair XR1, XR2. The DPE controller 28 includes a resistor R1 connected in series to resistors R4 and R3 which are connected across receive pair XR1 and XR2. Similarly, a resistive network comprised of resistor R2 in series with resistors R5 and R6 which are connected across transmit pair XT1' and XT2. When these respective resistive networks shown in FIG. 3A are connected across respective transmit and receive pairs with the AC/DC converter sourcing power across Vcc to RET, a phantom current of magnitude equivalent to that required by the IEEE 802.5 Standard for Token Ring is generated. Depending on the state of the connectors in MAU 26 (FIG. 1), the phantom current is transmitted to MAU 18 to open a switch placing the expander network 14 in serial communications with the main ring network 10 or the phantom current is contained within the expander network and not transmitted to the MAU 18.

Referring again to FIGS. 1 and 4, it should be noted that if none of the DTEs, connected to MAU 26, requires entry into the network, no phantom current is outputted from the connected device and, as a result, the switching relays in MAU 26 are closed. As a result, a short circuit (FIG. 4) is formed in MAU 26; DPE controller 28 and AC/DC power supply 31. Therefore, the phantom current generated is contained in the Expander network 14 and is not transmitted to MAU 18. Whenever a device, such as DTE 26' is connected to one of the ports of MAU 26 and requires entry into the network, the phantom current from the accessing device (26') causes the switching relay (FIG. 2A) in MAU 26 to open and the short circuit opens in the expander network 14. This, in turn, allows the DPE phantom current to be transmitted along cable 32 to connector 12 and into MAU 18 whereat the relay to which lobe 64' is connected is open thereby inserting the expander network 14 into the token ring network.

Figure 5:
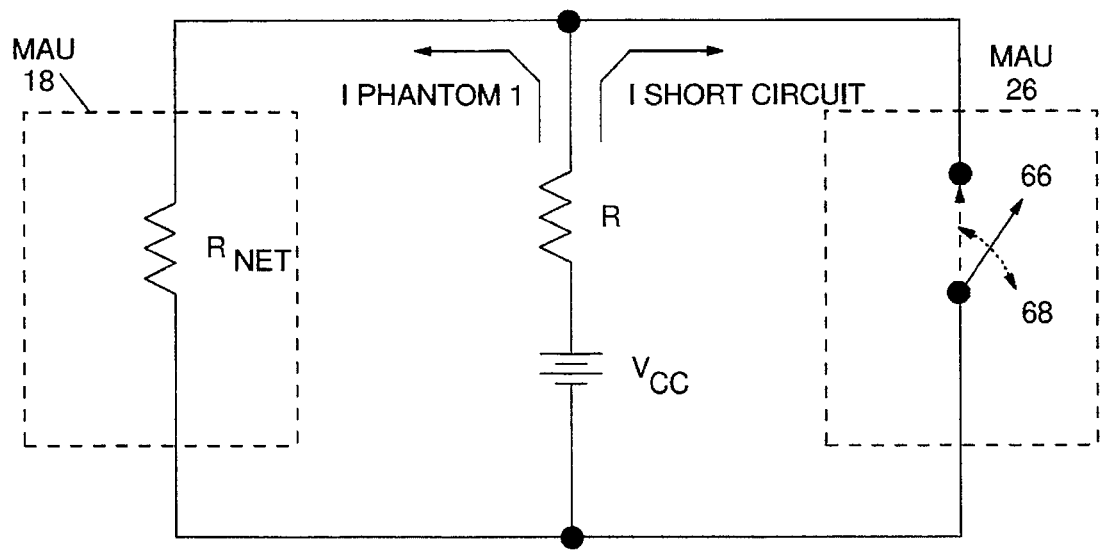
FIG. 5 shows an equivalent circuit of the invention and is helpful in understanding its operation.

Turning to FIG. 5 for the moment, a DC electrical equivalent circuit of the expander network 14 and MAU 18 are shown. In the network, the switch labeled 66 represents the expander network. Vcc represents the DC power source and R is a resistance in series with the DC voltage source and provides phantom current (I phantom). The $R_{net}$ represents the DC resistance looking into MAU 18. The arrow 68 indicates that switch 66 can be open or closed. When none of the port switches in MAU 26 (FIGS. 1, 2A and 4) is opened to let its connected device enter into the network, the switch 66 is in its closed position shown as a broken line single headed arrow in FIGS. 4 and 5. This causes a short circuit in the right hand side of the network (FIG. 5) and I (short circuit) circulates in that loop which is MAU 26.

During this time, no current flows to the left-hand loop to open the remote switch in MAU 18. The net result is that the Expander Network 14 is de-inserted from the main ring 10. However, when a terminal such as DTE 26' attached to MAU 26 (FIG. 1), wishes to enter the network DTE 26' generates the initial phantom current which causes the related relay in MAU 26 to be opened. The opening of that relay is simulated by switch 66 being open. With the switch in the open position, an open circuit is caused in the right-hand loop of FIG. 5 and I (short circuit) no longer flows in Mau 26. Simultaneous therewith, I phantom flows in the direction shown by the arrow labeled I phantom into MAU 18 to open the appropriate port switch to which the expander network is connected. As is obvious from this discussion, the expander network 14 provides a mechanism where a plurality of stations can be connected through a single outlet in the wall to the main ring LAN 10.

Referring again to FIG. 3A, the display panel 28' is provided with two LEDs, one of which indicates that the power to the unit is OK, the other indicating one or more DTEs 26' are satisfactorily inserted in the ring. The LED indicating power is labeled PWR and the ring insertion indicator is labeled Ring Insertion.

Figure 4:
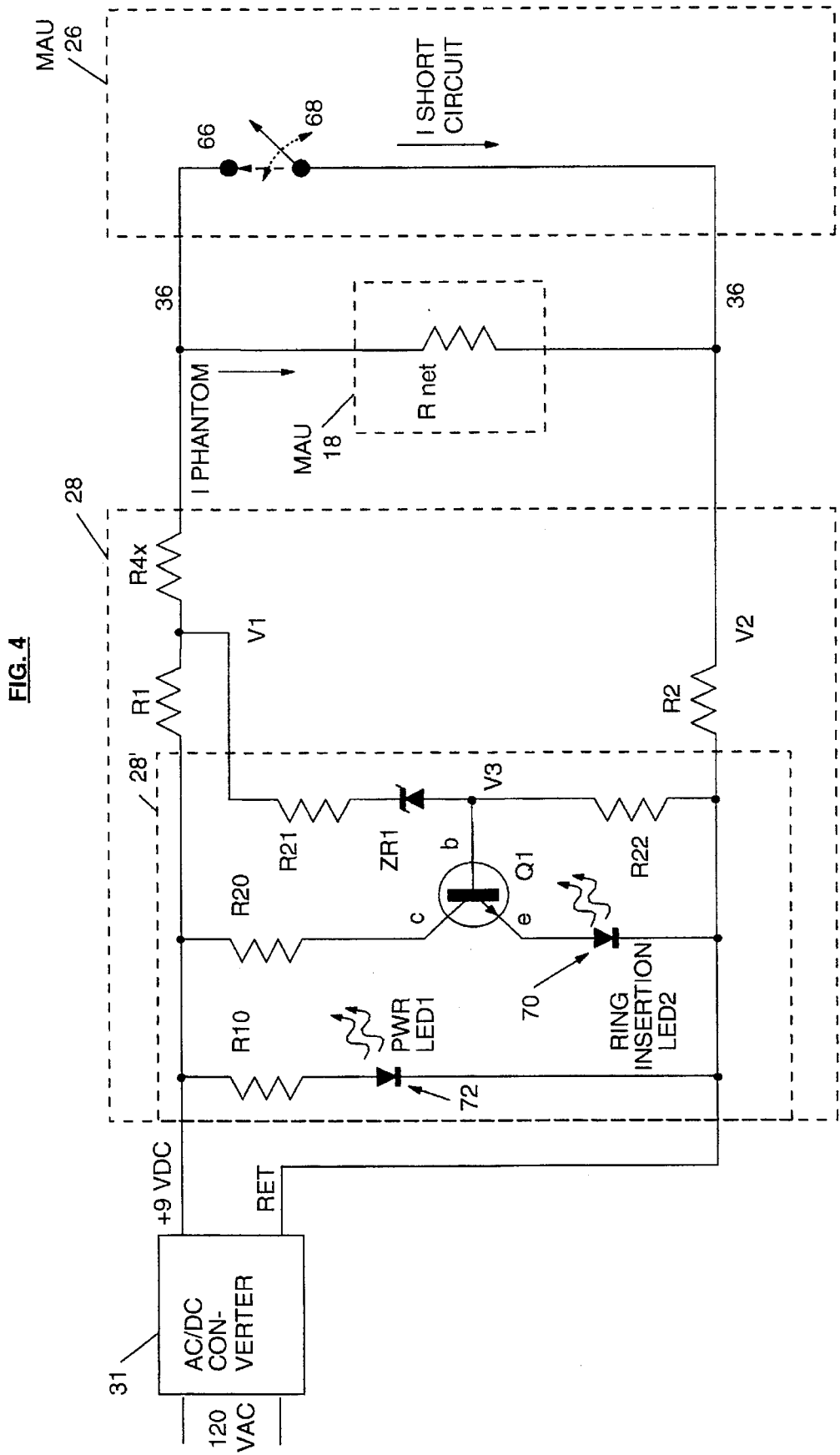
FIG. 4 shows a circuit arrangement for an operator's panel.

FIG. 4 shows a circuit arrangement for driving the operator or display panel with the two LED indicators 70 and 72.

The circuitry could be viewed as two separate sections termed device power indicator section and ring insertion indicator section. All the components are commercially available. The voltages are referenced to the return line labeled RET. The designer must select Vcc sufficiently high to satisfy the IEEE 802.5 Token Ring standard for phantom current (I phantom). In general, this level will be about 12 volts DC.

Power for the port expander is provided by the AC/DC converter 31. The power output sources current and it is represented by electrical rail Vdc. Current return to the converter is provided by the line labeled RET. When Vdc reaches its design level, the power indicator LED, of the device power indicator section emits light. The device power indicator section includes a current limiting resistor R10 in series with a light emitting diode LED1. The resistor values and LED types depend on a variety of conditions and can be found in catalogs of optoelectronics devices. The emitting light color usually depends on market and manufacturer requirements.

The ring insertion indicator circuitry includes R20, R21, R22, ZR1, Q1 and LED2. For purposes of discussion, it is assumed that Vdc has reached its operational potential. R4x represents the electrical parallel and series combination of R3, R4, R5 and R6 as shown in FIG. 3A. The basis of operation is the voltage variation across R4x due to switching action 68 within MAU 26. When switching element 66 is closed, voltage V1 equals voltage V2, since R1 and R2 have the same value, the value of V1 is ½ Vdc. Further, the effective value of R4x equals R1. Thus, when the switching element 66 opens, V1 is no longer equal to V2. In fact, the voltage level of V1 is now ⅔ Vdc.

The change of V1 from ½ Vdc to ⅔ Vdc is used to change the electrical bias of Q1. With V1 at ⅔ Vdc, Q1 is forward biased, allowing current to flow from Vdc through current limiting resistor R20, into Q1 and on to LED2 and returning via RET. If all the devices (not shown) attached to MAU 26 are disconnected, this in effect opens switching element 66 and V1 returns to ½ Vdc. With V1 at ½ Vdc, Q1 and LED2 are turned off. Based upon the electrical parameters for Q1, the resistance value R22 can be calculated to keep Q1 off. By injecting sufficient current into node V3, Q1 can be made to conduct when V3's potential is about 1.1 Vdc. This extra current becomes the available zener current Iz of ZR1. Thus, when V1 reaches ⅔ Vdc, the potential difference between V1 and V3 is high enough for ZR1 to conduct. Current through ZR1 is limited by R21. When V1 falls to ½ Vdc, Iz returns to zero and the transistor Q1 turns off. With Q1 turned off, LED2 is also off.

Figure 3B:
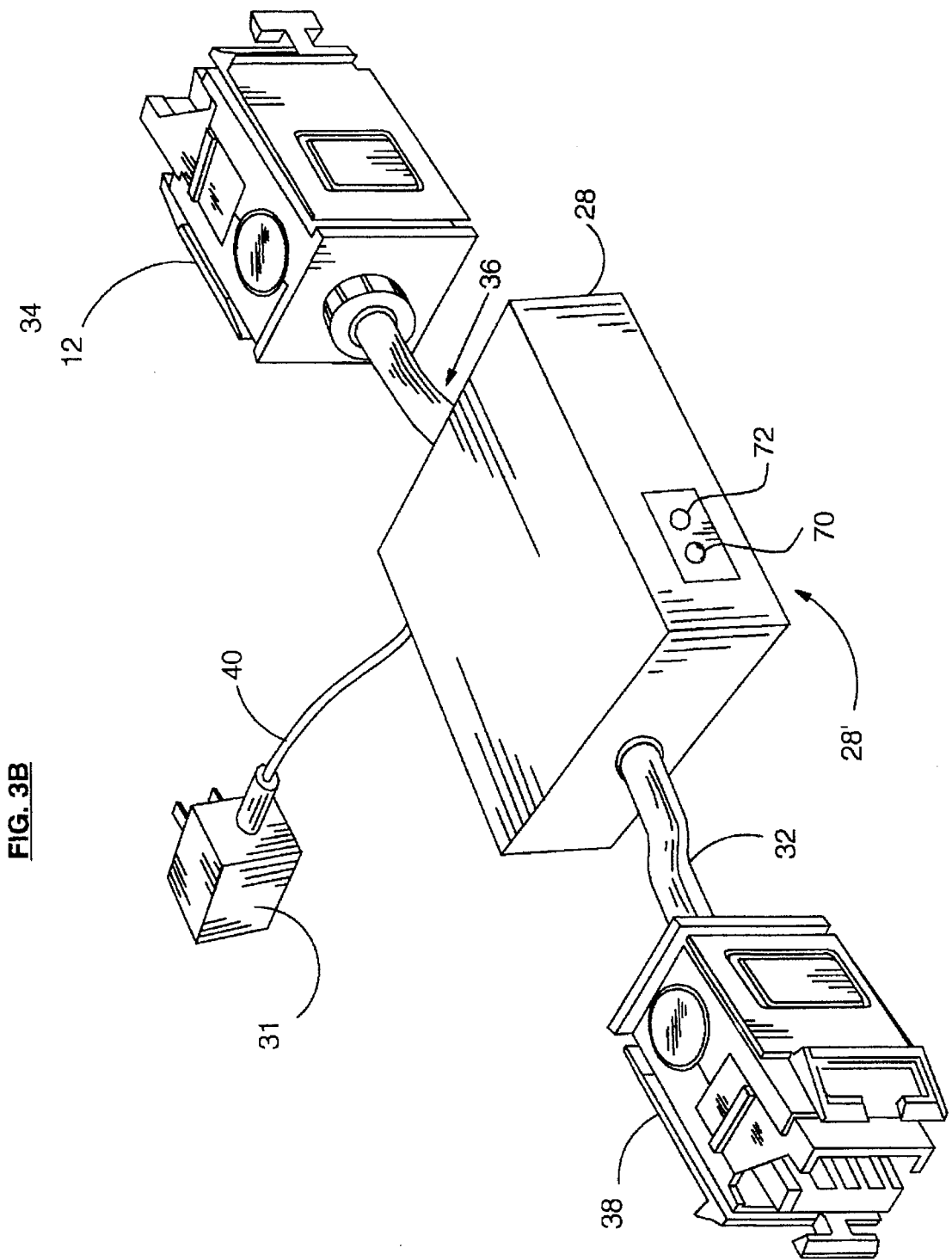

FIG. 3B shows a pictorial view of a device containing the necessary component that provides port extension when used with the MAU shown in FIG. 2B. Common numerals are used to identify components which are previously described. The device includes the AC/DC converter 31 for plugging into a power socket and an appropriate cable 40 interconnecting it to remote port multiplier controller 28. Display panel 28' is fitted in the housing of the remote port multiplier controller 28. A pair of LEDs identified by numerals 70 and 72 indicate the electrical state of the Expanded Network. Transmission cable lengths 36 and 32 couple the remote port multiplier controller 28 to hermaphroditic connectors 34 and 38 respectively. In assembling the device with MAU 26 to form an expander network for an office, one of the hermaphroditic connectors, say 34, is plugged into a similar hermaphroditic connector 12 (FIG. 1) in the office wall. Likewise, the connector 38 is plugged into ring in connector 38'. With this arrangement, approximately 8 ports are provided in MAU 26 so that 8 other devices can be plugged into MAU 26 and, when desired, gain access to the main token ring. As a result, additional ports are provided without the need to make changes to the previously wired backbone network.

While the invention has been described with reference to a particularly embodiment therein, changes in form and detail may be made therein without departing from the spirit and scope of the invention.

What is claimed is:

1. A data port expander for connecting multiple stations to any single lobe segment of a local area network (LAN) comprising:

a multi-port access unit having a housing in which a port for connecting the any single lobe segment is provided and a plurality of switching modules are mounted with each one of the plurality of switching modules for operatively coupling to a computing device which transmits and receives information from the local area network and said each one of the plurality of switching modules responsive to a control signal generated by said computing device to switch from a first state to a second state if the computing device wants to be inserted into the local area network; and a phantom current generator for generating a DC signal within the multi-port access attachment unit; said phantom current generator operating with the plurality of switching modules to form a closed loop in which the DC signal circulates within the phantom current generator and the multi-port access attachment unit and not exiting the port onto said single lobe segment if the plurality of switching modules are set in the first state or providing the DC signal to be transmitted on said single lobe segment to activate a remote switch wherein a computing device connected to said multi-port access attachment means communicates with other devices in the network if one of the plurality of switching modules is set in the second state.

2. The data port expander of claim 1 further including means coupled to the housing for indicating the operational state of said data port expander.

3. The data port expander of claim 1 wherein the phantom current generator includes:

a voltage generation means for generating a predetermined voltage;

a circuit arrangement coupled to the voltage generation means; said circuit arrangement responsive to the predetermined voltage to generate the DC signal; and a pair of transmit conductors coupled to the circuit arrangement.

4. The data port expander of claim 3 further including a data connector operatively coupled to the circuit arrangement; said data connector having a pair of transmit terminals connected to the pair of transmit conductors and a pair of receive terminals.

5. The data port expander of claim 4 wherein the circuit arrangement includes a resistive network.

6. The data port expander of claim 5 wherein the voltage generation means includes an AC to DC converter.

7. The data port expander of claim 6 wherein the resistive network includes a first pair of resistors connected, in series with end points connected to the pair of transmit conductors, and a first resistor connected at one end to a point between the first pair of resistors and at another end to the AC to DC converter.

8. The data port expander of claim 7 further including a second pair of resistors interconnected between the pair of receive terminals; and a second resistor interconnected a point between the second pair of resistors to another output of the AC to DC converter.

9. A device for use in a LAN to generate phantom current wherein computer stations, connected to a multiport access unit which is connected to any single lobe of the LAN, are given access to communicate with other computer stations connected to the LAN, said device comprising:

a voltage generating means for generating a DC voltage signal;

a first cable means for coupling to the any single lobe; and a circuit arrangement, positioned within the multiport access unit, for generating a phantom current with said phantom current looping within said multiport access unit so long as computer stations connected to the multi-port access unit are in a non-operational state and said phantom current exiting the multiport access unit to activate a remote insertion switch which allows a station connected to the multi-port access unit to communicate with other stations on the LAN if one of the stations connected to the multi-access unit becomes operational.

10. A token ring LAN comprising:

a looped communications media for transmitting information thereon;

at least one multi-port access unit having an input port connected to said looped communications media, an output port connected to said looped communications media and a plurality of identical switching ports for interconnecting computer station to said looped communications media; and a data port expander multi-access unit said data port expander multi-access unit having an expander input port coupled to one of the plurality of identical switching ports a plurality of expander switching ports for connecting to a plurality of computer stations; with each of the plurality of expander switching port including a switch which is set in a first state if one of the plurality of computer stations connected to said switch is in an off state and is set in a second state if said one of the plurality of computer stations is in an on state; and a phantom drive generator within the expander multi-port access unit for generating a phantom current which is circulated within the expander multi-port access unit if each of the switch is in the first state and if at least one of the switch is set to the second state, in response to a signal generated by a computer station connected to said at least one of the switch when said computer system is activated by a user wherein the phantom current stops circulating in the expander multi-port access unit and is conveyed by a conductor to activate a switch in the one of the plurality of identical switching ports to allow said computer station on the expander multi-port access unit to communicate with computer stations in the token ring LAN.

* * * * *